Nov. 24, 1925.

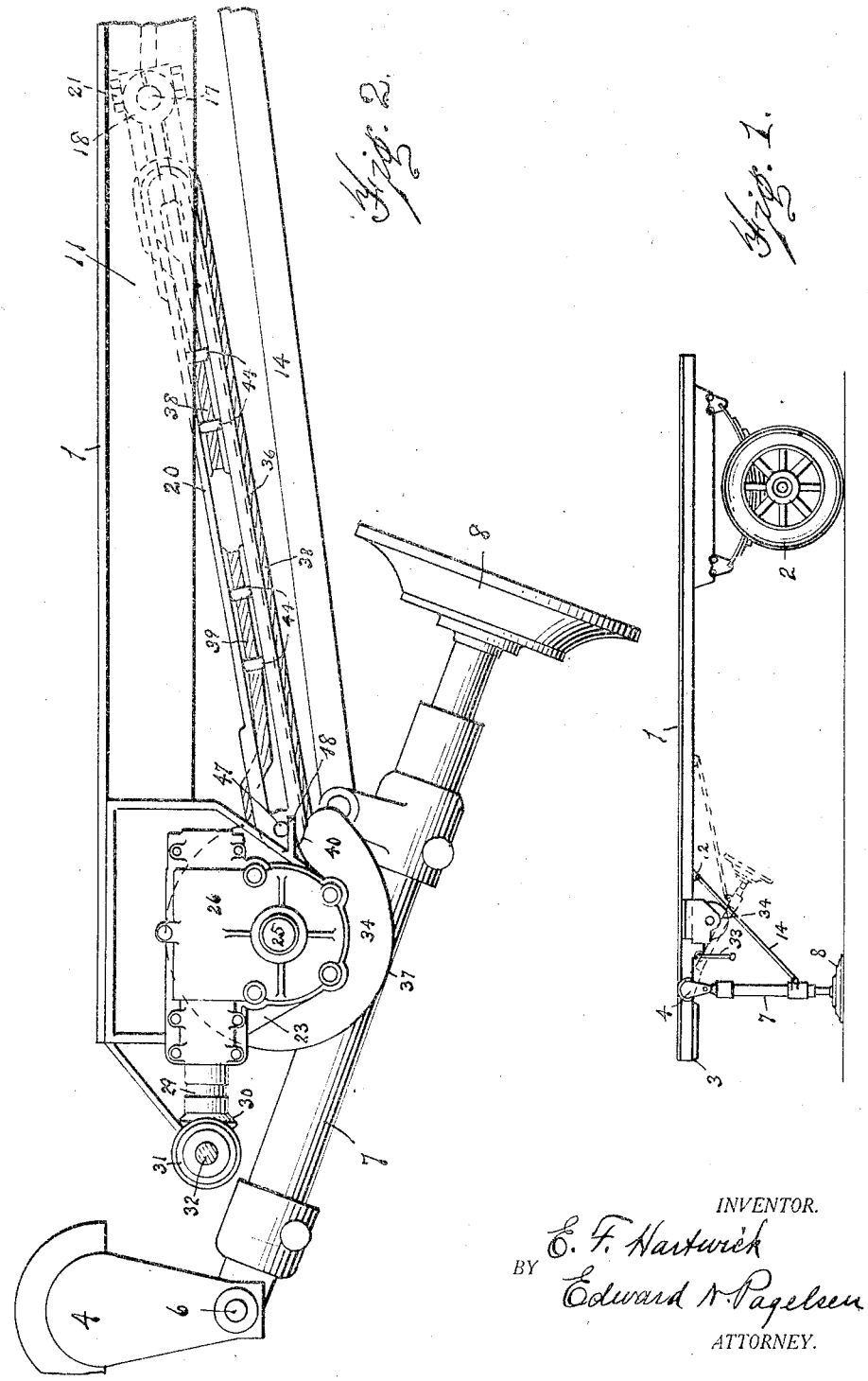

E. F. HARTWICK

TRAILER SUPPORT

Filed Sept. 10, 1923

1,562,960

3 Sheets-Sheet 2

INVENTOR.
E. F. Hartwick
BY Edward N. Pagelsen,
ATTORNEY.

Nov. 24, 1925.
E. F. HARTWICK
1,562,960
TRAILER SUPPORT
Filed Sept. 10, 1923    3 Sheets-Sheet 3
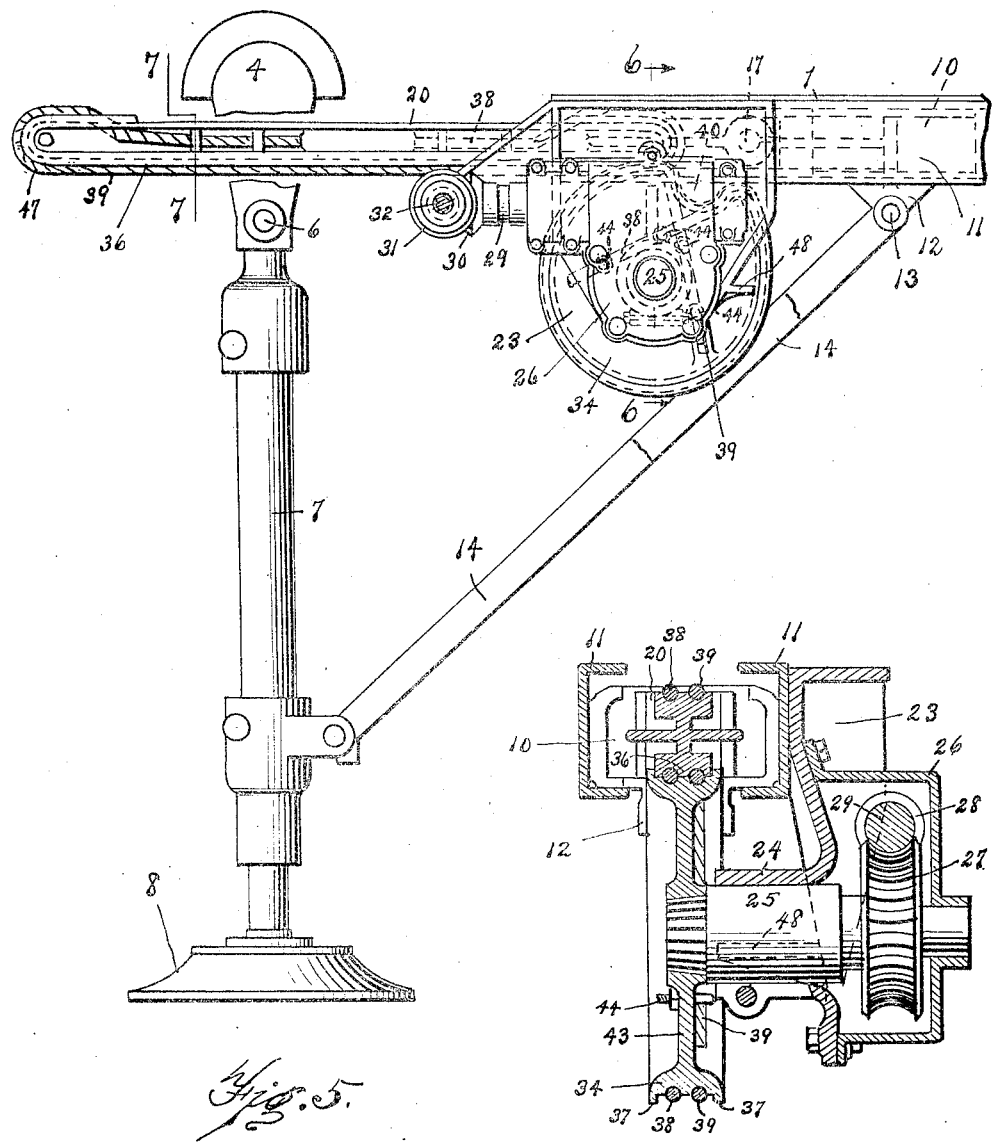
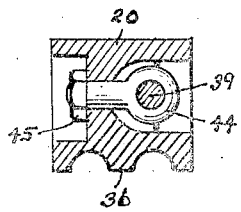
INVENTOR.
E. F. Hartwick
BY Edward N. Pagelsen
ATTORNEY.

Patented Nov. 24, 1925.

1,562,960

UNITED STATES PATENT OFFICE.

ERNEST F. HARTWICK, OF DETROIT, MICHIGAN, ASSIGNOR TO DETROIT TRAILER COMPANY, OF DETROIT, MICHIGAN, A CORPORATION OF MICHIGAN.

TRAILER SUPPORT.

Application filed September 10, 1923. Serial No. 661,749.

*To all whom it may concern:*

Be it known that I, ERNEST F. HARTWICK, a citizen of the United States, and residing at Detroit, in the county of Wayne and State of Michigan, have invented a new and Improved Trailer Support, of which the following is a specification.

This invention relates to legs for supporting the front ends of two-wheeled trailers when they are disconnected from their tractors, and its object is to provide simple and reliable means for swinging such legs up toward the chassis or frame of the trailer and for holding them in such elevated position.

This invention consists, in combination with a pair of pivoted supporting legs for the front end of a trailer, a slidable carriage and guides therefor, and links connecting the legs and carriage, of operating means for said carriage comprising a driven pulley, a link connected to the carriage and a flexible connection between the link and pulley.

It further consists in a pulley for actuating said carriage and link provided with a notch to receive the end of the link opposite the carriage to hold the link and carriage in position to keep the legs elevated.

It also consists in the details of construction illustrated in the accompanying drawings and particularly pointed out in the claims.

Figure 3:
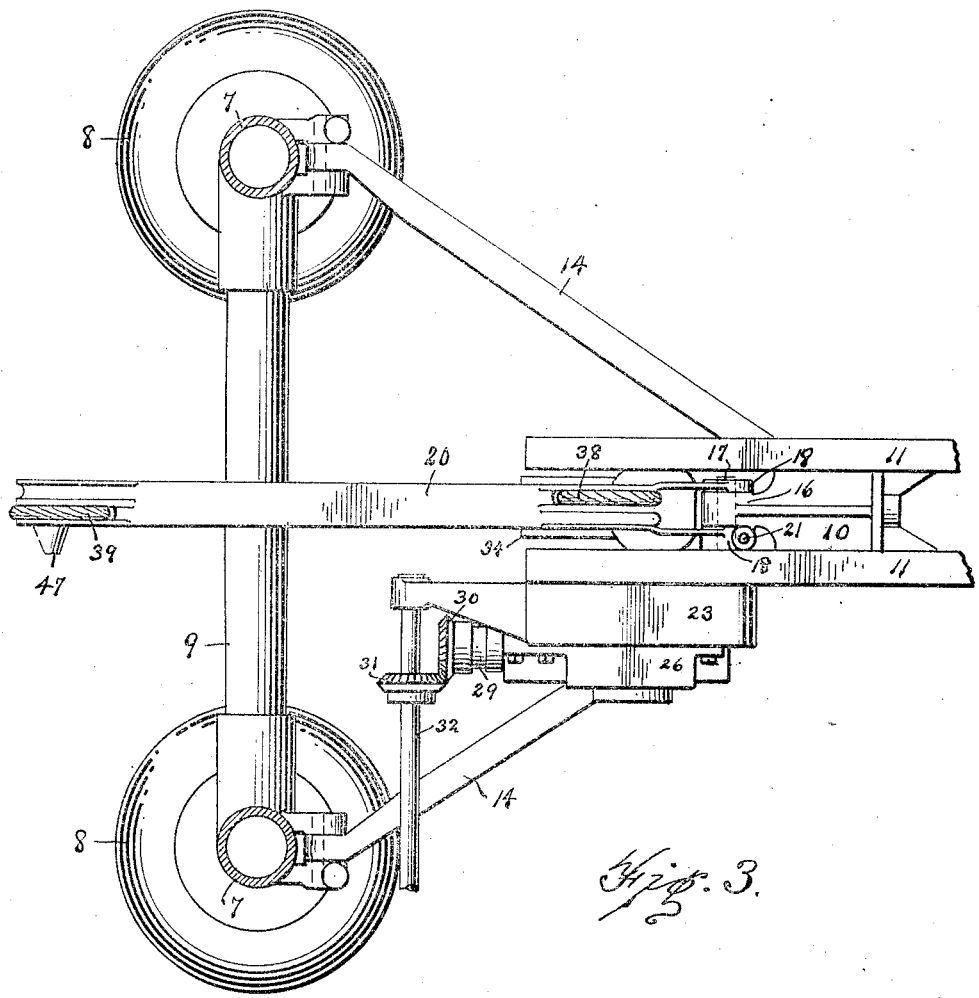
Figure 4:
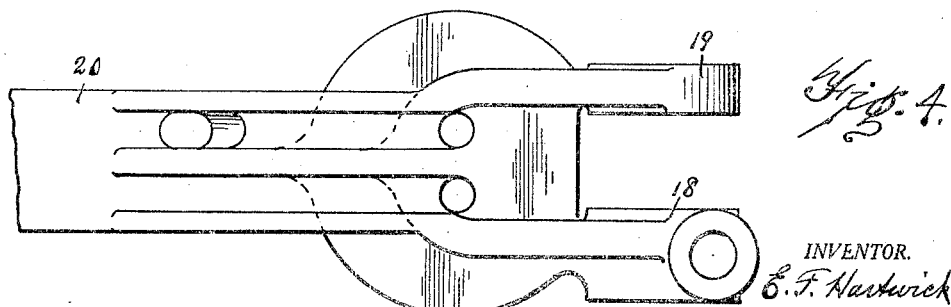

In the accompanying drawings, Fig. 1 is a side elevation of a two-wheel trailer having its front end held up by my improved support. Fig. 2 is a side elevation of this support and its operating mechanism on a larger scale. Fig. 3 is a plan thereof. Fig. 4 is a plan of the rear end of the main link. Fig. 5 is a side elevation of the support in operative position. Figs. 6 and 7 are sections on the lines 6—6 and 7—7 of Fig. 5.

Similar reference characters refer to like parts throughout the several views.

The trailer 1 and its rear wheels 2 and fifth wheel 3 are of any desired construction. Brackets 4 attached to the side bars 5 of the truck chassis support pivots 6 for the legs 7 which are provided with adjustable feet 8. These legs are preferably connected by a brace 9 (Fig. 3) and connect by means of links 14 to a slidable block or carriage 10 which is guided by the channel bars 11 which are part of the chassis. This carriage embodies a lug 12 and a pin 13 on which the links 14 are mounted.

On the front end of this carriage 10 is a lug 16 which carries a pin 17 which extends through the eyes 18 and 19 at the rear end of the bifurcated main link 20. The eye 18 is split so it may be clamped onto this pin 17 by means of a bolt 21.

A frame 23 is attached to one of the channel bars 11 (Fig. 6) and embodies a bearing 24 for the short shaft 25 and also embodies a cover 26 which encloses the worm wheel 27 mounted on this shaft and the worm 28 meshing therewith. This worm is on the countershaft 29 which has a bevel gear 30 on its forward end meshing with a bevel gear 31 on the cross shaft 32 which may be turned by a crank 33 shown in Fig. 1. A rope pulley 34 is secured on the inner end of the shaft 25.

The main link 20 embodies a flat bottom 36 adapted to ride on the face of this pulley 34 between the flanges 37 thereon and the bottom of this link and the face of this sheave are each formed with two grooves to receive the flexible connectors 38 and 39, both preferably of wire cables. The sheave is formed with a pocket 40, shown in dotted lines in Fig. 5, to receive the front end of the link 20 when that is in its rear position, as shown in Fig. 2.

The cable 39 has one end secured to the web 43 of the pulley 34, passes out through a hole in the rim of the pulley, then along the bottom of the link 20, up around over its front end and is attached thereto by bolts 44 and nuts 45, as shown in Fig. 7, similar bolts being employed to secure the opposite end to the pulley 34. The cable 38 has one end attached to the opposite side of the web of the pulley, passes out through a hole in the rim thereof, thence around the rim and then around over the rear end of the link 20, being secured to the link and the pulley by similar bolts 44. The circumferential distance from the point where the cable 38 passes through the rim of the pulley to a vertical plane passing through the shaft 25 equals the distance from this plane to a transverse vertical plane passing through the axis of curvature of the rounded front end of the link 22.

When the shaft 32 is turned to turn the pulley 34 clockwise or to the right in Fig.

5, the cable 39 will be wound onto the pulley and the cable 38 unwound, causing the link 20, the carriage 10 and the links 14 to move rearward, to the position shown in dotted lines in Fig. 1 and in solid lines in Fig. 2. This carries the front end of the link 20 beyond the shaft 25 until it rests in the recess 40 in the rim of the pulley 34 and is carried down thereby until a projection or lug 47 at one side of the front end of this link rests on a bracket 48 on the frame 23. This bracket is so positioned that the lug 47 is below a line connecting the centers of the shaft 25 and the pivot 17 so that the forward thrust of the carriage 10 because of the weight of the legs 7 will have no tendency to turn back the pulley 34. In fact, considerable force must be exerted by the crank 33 on the pulley 34 before this forward end of the link 20 can be lifted so that the link may move forward. This forward movement is caused by the weight of the legs 7 but permitted by the rotation of the pulley 34 and of the shaft 32. In rotating, the pulley winds up the cable 38 and unwinds the cable 39.

Attention is called to the fact that this device is self-locking when the legs are elevated and that the movement is limited by the bracket 48 and lug 47. The device requires but little attention as the case for the worm and worm gear may be filled with grease and an occasional application of grease to the other contacting parts is sufficient. All of the parts can be made of ample size as there is sufficient space therefor.

The details of construction and the proportions of the parts may all be changed by those skilled in the art without departing from the spirit of my invention as set forth in the following claims.

I claim:—

1. In a trailer support, the combination of a pair of legs pivoted at their upper ends so as to be adapted to swing up towards the frame of the trailer, a carriage slidable longitudinally of the trailer and guides therefor, means connecting the legs to the carriage, a shaft extending transversely of the trailer and means to rotate the shaft in either direction, a pulley on the shaft, a link connecting to the carriage and resting on the pulley, and a flexible connection between the pulley and link.

2. In a trailer support, the combination of a pair of legs pivoted at their upper ends so as to be adapted to swing up towards the frame of the trailer, a carriage slidable longitudinally of the trailer and guides therefor, means connecting the legs to the carriage, a shaft extending transversely of the trailer and means to rotate the shaft in either direction, a pulley on the shaft, a link connecting to the carriage and resting on the pulley, and a flexible connection between the pulley and link, said link and pulley having grooves in their adjacent faces to receive said flexible connection.

3. In a trailer support, the combination of a pair of legs pivoted at their upper ends so as to be adapted to swing up towards the frame of the trailer, a carriage slidable longitudinally of the trailer and guides therefor, means connecting the legs to the carriage, a shaft extending transversely of the trailer and means to rotate the shaft in either direction, a pulley on the shaft, a link connecting to the carriage and resting on the pulley, and a pair of flexible connectors between the pulley and link and extending from opposite ends of the link along one side thereof to said pulley, one of said connectors winding onto the pulley as the other unwinds.

4. In a trailer support, the combination of a pair of legs pivoted at their upper ends so as to be adapted to swing up towards the frame of the trailer, a carriage slidable longitudinally of the trailer and guides therefor, means connecting the legs to the carriage, a shaft extending transversely of the trailer and means to rotate the shaft in either direction, a pulley on the shaft, a link connecting to the carriage and resting on the pulley, and a pair of flexible connectors between the pulley and link and extending from opposite ends of the link along one side thereof to said pulley, one of said connectors winding onto the pulley as the other unwinds, said pulley and the adjacent side of the link being grooved to receive said connectors.

5. In a trailer support, the combination of a pair of legs pivoted at their upper ends so as to be adapted to swing up towards the frame of the trailer, a carriage slidable longitudinally of the trailer and guides therefor, means connecting the legs to the carriage, a shaft extending transversely of the trailer and means to rotate the shaft in either direction, a pulley on the shaft, a link connecting to the carriage and resting on the pulley, and a pair of flexible connectors between the pulley and link and extending from opposite ends of the link along one side thereof to said pulley, one of said connectors winding onto the pulley as the other unwinds, said pulley being provided with a recess to receive the forward end of said link when said legs are elevated to hold said legs in their elevated position.

6. In a trailer, a frame, a support pivoted at its upper end directly on the frame so as to be adapted to swing up toward the frame of the trailer, a carriage movable longitudinally of the trailer, means connecting the support to the carriage, a shaft, and means embodying a flexible connector and a pulley on the shaft to receive the connector to move the carriage back and forth.

ERNEST F. HARTWICK.